United States Patent Office
3,804,780
Patented Apr. 16, 1974

3,804,780
CATALYST OF ZINC-RARE EARTH
EXCHANGED ZEOLITE
Robert C. Wilson, Jr., Woodbury, N.J., assignor to
Mobil Oil Corporation
No Drawing. Mar. 15, 1972, Ser. No. 235,040
Int. Cl. B01j 11/40
U.S. Cl. 252—455 Z
4 Claims

ABSTRACT OF THE DISCLOSURE

A catalyst stabilized with respect to heat and steam which comprises a crystalline aluminosilicate zeolite having an ordered internal structure and uniform pores, said zeolite having been exchanged with an amount of rare earth cations such that the amount of rare earth, calculated as rare earth oxide, is between 6 and 13 percent by weight, based on the weight of the zeolite, said zeolite also containing zinc present in an amount less than 2.5 weight percent based on the weight of the zeolite; hydrocarbon conversion, especially catalytic cracking and hydrocracking with such a zeolite and a method of preparing the so exchanged zeolite.

BACKGROUND OF THE INVENTION

Field of the invention

This invention is directed to preparing a zeolite catalyst having exceptional thermal and steam stability properties which is useful in converting hydrocarbons, especially gas oils, to more useful products. More particularly, this invention is directed to a particular zeolite containing rare earth and a stabilizing amount of zinc in exchanged form which enhances the properties of the zeolite with respect to thermal and steam stability without adversely affecting the catalytic properties of the zeolite in terms of its ability to convert hydrocarbons or provide desired products.

Description of the prior art

For some time zeolite catalysts have been known to be useful in converting hydrocarbons. There exist numerous patents which disclose that zeolites, such as zeolites X and Y, are useful in an exchanged form, to convert gas oils to gasoline. The art has shown that it is desirable to convert zeolite X or zeolite Y into a rare earth form as such rare earth form provides desired thermal stability. These zeolite catalysts are highly active, as compared to silica-alumina, and are particularly useful because of their high selectivity characteristics in the cracking of gas oils.

The art is replete with disclosures of various substances which can be employed as suitable cations for replacement of the alkali metal cations found in the as synthesized form of zeolites. Thus, generally speaking, it is known to base exchange a crystalline aluminosilicate zeolite with a salt of a metal from Groups II-A to VIII of the Periodic Table. As stated above, the art has recognized that rare earth cations may be employed in the exchange medium and in some cases the rare earth cations are employed together with a hydrogen precursor cation to provide a mixed exchanged form of the zeolite. In certain small pore zeolites it has been advocated that the cations be exchanged with zinc. Thus, there are disclosures in the patent literature which suggest that erionite, a shape-selective zeolite material, be exchanged with zinc to provide a form useful in, for instance, shape selective conversion wherein normal paraffins are converted in preference to isoparaffins which do not enter the pores of the molecular sieve.

The art has not suggested that zeolites can be benefited by a particular cationic balance between rare earth and zinc cations.

SUMMARY OF THE INVENTION

Broadly, this invention contemplates a crystalline aluminosilicate zeolite having rare earth cations exchanged therein in an amount between 6 and 13 percent by weight, calculated as the rare earth oxide, and an amount of exchanged zinc present in a quantity less than 2.5 percent by weight.

DESCRIPTION OF SPECIFIC EMBODIMENTS

In a cracking operation, resistance of the catalyst to steam is significant because steaming is utilized to purge the spent catalyst prior to regeneration. If the activity is substantially diminished due to purging with steam, it becomes necessary to withdraw the catalyst and to replace it with fresh catalyst adding to the expense of the cracking operation. Similarly, thermal stability in the catalyst employed is a highly desirable attribute.

It has now been found that rare earth containing zeolites useful in the cracking of hydrocarbons can be improved with respect to steam and thermal stability by exchanging the zeolite additionally with a minor controlled quantity of zinc. More specifically, it has been found that a highly useful thermal and steam stable crystalline aluminosilicate is provided by exchanging the zeolite into a zinc-rare earth form wherein the quantity of zinc and rare earth are maintained within a relatively narrow range. Specifically, it has been found that if the amount of rare earth is between 6 and 13 percent by weight, calculated as the oxide, and the quantity of zinc is less than 2.5 weight percent, and preferably between .05 and 2.5 and more particularly between 0.1 and 2 weight percent, that the resultant catalyst is markedly superior to comparable zeolites but which do not contain the specified controlled quantities of zinc and rare earth. It has also been found that the amounts of zinc and rare earth are critical. Thus, an excessive amount of zinc in a rare earth exchanged zeolite Y, for instance, has a harmful effect on selectivity of a cracking operation. Specifically, if the zinc is present in excess of about 2.5 percent by weight, cracking of gas oil with the catalyst provides an undesirably high amount of coke and hydrogen.

The level of rare earth in the zeolite catalyst is also important. At low rare earth contents, the resultant material is characterized by poor steam stability while at high levels, the thermal stability of the rare earth exchanged zeolite is poor. To illustrate the above, stability data were obtained on catalysts which contained 90% by weight clay and 10% by weight of a zinc-rare earth exchanged zeolite Y or a zinc-rare earth-hydrogen exchanged zeolite Y and which showed satisfactory selectivity. These data indicated that as the rare earth content of the zeolite Y increased above about 13 weight percent, calculated as the oxide, the thermal stability of the catalyst deteriorated. On the other hand, catalysts made with zeolite Y containing less than 6 weight percent rare earth showed significant loss in activity after exposure to steam under conditions simulating those encountered in catalytic cracking operations. The steam stabiilty and the thermal stability of those materials containing an intermediate amount of rare earth oxide, on the other hand, remained at an extremely high level.

It should be understood that the method herein disclosed of imparting to zeolites exceptional thermal and steam stability through ion exchange with a stabilizing controlled amount of zinc and rare earth is broadly applicable to numerous zeolites. Particularly contemplated are those zeolites which have large pores and these include synthetic faujasites, such as zeolites X and Y. Other zeolites which are particularly contemplated include zeolite ZSM-3 described in U.S. 3,415,736, zeolite ZSM-4 described in U.S. 3,578,723, zeolite beta described in U.S. 3,308,069, mordenite, zeolite T, erionite, offretite, zeolite L, ZK-21, ZK-4, ZK-5, as well as the other zeolites, both natural and synthetic, which have been described in the literature and referred to in patent such as U.S. 3,140,249 and U.S. 3,140,253.

The zeolite so exchanged with rare earth and zinc is desirably employed in a commercial cracking operation together with a porous inorganic oxide and matrix material. Thus, it is desirable that the zeolite be dispersed, composited, or otherwise uniformly distributed throughout and held within a porous inorganic oxide matrix material. Such matrix materials include active and inactive materials and synthetic or naturally occurring inorganic oxides such as clays, silica and/or metal oxides. The latter may be either naturally occurring or in the form of gelatinous precipitates or gels including mixtures of silica and metal oxides. Use of an active material in conjunction with this zeolite, i.e., combined therewith, tends to improve the conversion and/or selectivity of the catalyst in certain organic conversion processes. Inactive materials suitably serve as diluents to control the extent of the conversion in a given process so that products can be obtained economically and orderly without employing other means for controlling the rate of reaction. Such diluent may serve to prevent excess cracking of gas oils which may yield products which are undesirable.

The zinc-rare earth exchanged molecular sieve catalyst of the present invention is particularly useful when combined, dispersed or otherwise uniformly distributed throughout a clay material, such as bentonite or kaolin. It has been found that cracking operations with such a composite catalyst material provide high yields of desirable products at excellent conversion rates, economically. Additionally, by virtue of the controlled amount of zinc and rare earth in the zeolite, the resultant catalyst is characterized by high thermal and steam stability. Such stability is economically attractive in that fresh catalyst need be introduced into the cracking system far less frequently by virtue of the particular cationic balance in the catalyst employed.

Naturally-occurring clays which can be composited with the rare earth-zinc zeolite component include the montmorillonite and kaolin families of clays, which families include the subbentonites, and the kaolins commonly known as Dixie, McNamee, Georgia and Florida clays or others in which the main mineral constituent is halloysite, kaolinite, dickite, nacrite, or anauxite. Such clays can be used in the raw state, as originally mined, or initially subjected to calcination, acid treatment or chemical modification. Binders useful for compositing with the zeolite component also include other inorganic oxides or inorganic oxide systems especially those containing alumina.

In addition to the foregoing materials, the zeolite can be composited with a porous matrix material of the synthetic variety such as silica-alumina, silica-magnesia, silica-zirconia, silica-thoria, silica-beryllia, silica-titania, as well as ternary compositions such as silica-alumina-thoria, silica-alumina-zirconia, silica-alumina-magnesia and silica-magnesia-zirconia. The matrix can be in the form of a cogel. The relative proportions of finely-divided zeolite component in the matrix can vary within wide limits. Generally speaking, the zeolite content is between 1 and 90 percent by weight.

There are various methods by which the desirable catalyst of the present invention can be prepared. It has been stated above that the zeolite component is exchanged with rare earth and zinc. One method of accomplishing this is to rare earth exchange the molecular sieve to the desired rare earth level, calcine the same and zinc exchange to a level less than about 2.5 percent by weight. The so calcined and exchanged molecular sieve can thereafter be composited with the matrix material. Another method is to prepare a mixed exchanged solution containing the desired amount of rare earth cation and zinc cation and to competitively exchange the molecular sieve component with the single solution to thereby exchange the alkali metal cations of the molecular sieve with the desired amounts of rare earth cations and zinc. The so exchanged molecular sieve is thereafter calcined and composited with the matrix. The matrix together with the zeolite can be subjected to a further exchange to reduce the total alkali metal content of the composite to a desired level, generally below 4 percent by weight of exchangeable alkali metal cation.

Still another method for accomplishing the desired result involves an initial exchange with either rare earth or zinc of the molecular sieve component, calcining the molecular sieve, incorporating the same together with an inorganic oxide matrix material and exchanging the resultant composite with the cation which was not employed in the initial exchange of the molecular sieve component itself. Thus, if the first exchange is with rare earth cations, then the exchange of the composite will be with zinc. The exchange of the molecular sieve component or of the composite itself, in this latter instance, can be a competitive exchange wherein the rare earth cations or zinc cations are in admixture with other cations such as cations of a hydrogen precursor, especially ammonium cations.

Ion exchange is accomplished in the known manner by using a salt of the desired metal in a solution, usually an aqueous solution. The temperature of the ion exchange solution is usually at room temperature although good results can be obtained employing a solution having a temperature up to the boiling point in the solvent. Under pressure conditions, the temperatures can be even higher than the normal boiling point of the solution in which case precautions should be taken to avoid impairment of the crystallinity of the molecular sieve. Such exchange does enable reduction of the alkali metal content to exceptionally low levels. Ion exchange can be performed on the zeolite component before or after admixture with the porous matrix material as above specified. Additionally, the matrix material can be subjected to an ion exchange apart from and prior to composition with the molecular sieve component. Such enables reduction of the alkali metal content, if any, of the matrix material prior to final catalyst preparation.

Excellent results are achieved by ion exchanging the crystalline aluminosilicate apart from the matrix and calcining the so exchanged material at temperatures within the range of 500 to 1500° F. prior to incorporation of the zeolite component with the matrix. This calcination fixes the rare earth or zinc component into the molecular sieve and enables further reduction of alkali metal content after the zeolite component is composited with the matrix. Furthermore, the resultant composition has excellent thermal properties. When the matrix is composited, the final exchange is effected to reduce the catalyst composition to a low exchangeable alkali metal content.

With the utilization of a controlled amount of zinc in a rare earth exchanged zeolite, it has been found that the exchangeable alkali metal content of molecular sieve is not as critical as in prior art type catalysts. Specifically, the effect of greater sodium content in a zinc-containing catalyst composition is not particularly appreciable. Thus, it has been found that thermal stability and steam stability of a zinc-containing rare earth exchanged zeolite is superior to a non-zinc containing rare earth exchanged zeolite notwithstanding the fact that the zinc containing rare earth exchanged zeolite catalyst contained almost twice as much sodium. (1.6 weight percent sodium against 0.83 weight percent sodium.)

A highly desirable embodiment of the present invention is a zinc-rare earth-hydrogen exchanged zeolite, particularly the Y zeolite. If the same is incorporated in a clay matrix such as a kaolin clay the activity of the catalyst is approximately the same as a rare earth exchanged zeolite Y catalyst in a clay matrix but the selectivity can be slightly better. The real advantage is that the thermal and steam stability properties are very significantly better than the rare earth exchanged zeolite Y in the clay matrix. Specifically, it has been found that where a REY-clay catalyst lost 36 percent of its activity, after being subjected to thermal treatment, the loss in activity of a ZnREHY-clay catalyst was only 12 percent. Upon subjecting the catalysts to steam, the REY-clay catalysts lost 1 percent of its activity whereas there was no loss for the ZnREHY-clay catalyst.

The catalyst compositions of the present invention can be converted into hydrocracking catalyst compositions by including a hydrogenation component in association with the zeolite or matrix component. Such hydrogenation components include, for example, metals of Groups VI and/or VIII such as nickel, tungsten, palladium and platinum. Such can be deposited, impregnated or otherwise intimately associated with the catalyst composition by known methods. In such case, they can be in an oxide form, a sulfide form or in an elemental form where they perform a hydrogenation function in conjunction with the cracking function during a hydrocracking operation.

The rare earth salts employed to affect rare earth exchange can either be the salt of a single rare earth metal or preferably mixtures of metals such as rare earth chlorides or didymium chlorides. As hereinafter referred to, a rare earth chloride solution is a mixture of rare earth chlorides consisting of the chlorides of lanthanum, cerium, neodymium and praseodymium with minor amounts of samarium, gadolinium and yttrium. The rare earth chloride solution is commercially available and it contains the chlorides of a rare earth mixture having the relative composition: cerium (as $CeO_2$) 48 percent by weight, lanthanum (as $La_2O_3$) 24 percent by weight, praseodymium (as $Pr_6O_{11}$) 5 percent by weight, neodymium (as $Nd_2O_3$) 17 percent by weight, samarium (as $Sm_2O_3$) 3 percent by weight, gadolinium (as $Gd_2O_3$) 2 percent by weight, and other rare earth oxides 0.8 weight percent. Didymium chloride is also a mixture of rare earth chlorides in varying amounts of lanthanum, cerium, praseodymium, neodymium, samarium, gadolinium, yttrium and other oxides. It is to be understood that other mixtures of rare earth are equally applicable in the instant invention.

The zinc content can be supplied by any number of zinc salts especially those soluble in an aqueous solution. Particularly contemplated are zinc nitrate, zinc chloride, zinc sulfate and zinc acetate.

If the catalyst is to be ammonium exchanged, representative ammonium compounds which can be employed include ammonium chloride, ammonium bromide, ammonium iodide, ammonium sulfate, ammonium acetate, as well as those ammonium compounds set forth in U.S. 3,140,253. Such ammonium exchange not only reduces the alkali metal content but provides a catalyst which is highly useful and is a desirable form of the zinc-rare earth exchanged zeolite catalyst of the present invention. It should be recognized that for large pore molecular sieves certain forms of tetraalkyl and tetraaryl ammonium salts can be employed to effectuate some exchange. It is preferred, however, to use the simple salts because of their molecular size and their availability.

Employing the catalyst of the present invention for catalytic cracking, hydrocarbon cracking stocks, especially gas oils, can be cracked at liquid hourly space velocities between 0.5 and 200. Temperatures between 550° F. and 1150° F. can be employed together with pressures ranging from subatmospheric pressure to several hundred atmospheres. Additionally, if the catalyst composite is formed into a fluid size, fluid catalytic cracking can be performed in multi-riser or single riser fluid catalytic cracking units. Such units desirably utilize spray dried composite catalysts wherein the catalyst is formed by dispersing the molecular sieve component in a matrix forming solution, and spray drying the same into desired particle forms.

Catalysts of rare earth-zinc enxchanged crystalline aluminosilicate zeolites impregnated with a hydrogenation component can be used in the wide variety of processes in which a hydrogenation or dehydrogenation function is performed. Employing catalysts prepared by this invention, heavy petroleum residual stocks, cycle stocks, vacuum resids, topped crudes and the like can be hydrocracked at temperatures between 400° F. and 1000° F. employing a molar ratio of hydrogen to hydrocarbon in the range of 2 to 80. The pressure employed will vary between 500 and 5000 p.s.i.g. and the liquid hourly space velocity would be between 0.1 and 10.

Certain forms of the catalyst of the present invention can be employed as a reforming catalyst. The reforming of a naphtha, especially a light naphtha, can be performed between 700° F. and 1100° F., at a pressure between 50 and 1000 p.s.i.g., preferably between 150 and 500 p.s.i.g. The liquid hourly space velocity is generally between 0.1 and 10, preferably between 0.5 and 5 and the hydrogen to hydrocarbon mole ratio is generally between 1 and 20, preferably between 4 and 10.

In order to more fully illustrate the nature of the invention and the manner of practicing the same, the following examples are presented:

EXAMPLES

In these examples, a sodium zeolite Y was employed as the initial starting material for the zeolite component. The zeolite had a silica to alumina mole ratio of 5.2 and a sodium oxide to alumina mole ratio of 1.05. Its crystallinity, based on a standard preparation, was 100 percent. The zeolite Y catalyst in exchanged form was composited with kaolin clay.

In exchanges of the sodium zeolite Y, the exchange was accomplished by employing 10 grams of a 10 weight percent solution per gram of sodium zeolite Y on an ignited basis. The exchanges were for 2 hours at 195° F. In several instances, the zeolite catalyst was calcined after an initial exchange and prior to a subsequent exchange. Calcinations were performed by placing the zeolite in a deep bed and calcining it in a preheated muffle for 2 hours at 1200° F.

In the examples reported in tabular form below, the method of various exchanges is set forth except for the reference catalyst, i.e., Example 5. Referring to Example 2, for instance, the method of exchange was to initially rare earth exchange the zeolite Y; to follow that with a zinc exchange which in turn was followed with an ammonium exchange. The subsequent calcination of the exchanged form converted the ammonium form to a hydrogen form. In Example 18, for instance, the exchange procedure involved a calcination. Specifically, the sodium form of zeolite Y was exchanged with a 10 percent by weight mixed $Zn-RE-NH_4$ solution, then calcined by the deep bed technique for 2 hours in a 1200° F. preheated muffle. Thus, the abbreviation CAL refers to this precalcination technique. After calcination, it was exchanged again in the same manner.

The so exchanged zeolite Y was washed and dried. Ten weight percent, ignited basis, of zeolite Y in exchanged form was mixed with 90 percent, ignited basis, of the kaolin as a 35–40 weight percent solid slurry. The catalyst was dried and granulated to 4/10 Tyler mesh.

The dried composite catalysts, prior to catalytic evaluation, were finished by air tempering for 10 hours at 1000° F. and 0 p.s.i.g., followed by steam treating in 100 percent steam for 14 hours at 1290° F. and 0 p.s.i.g. A portion of most catalysts was given a steam stability test which comprised subjecting the finished catalyst to 100 percent steam for 5 hours at 1160° F. and 100 p.s.i.g. Catalysts were also given a thermal stability test which comprised subjecting them to 5 percent steam for 24 hours at 1550° F. and 0 p.s.i.g., followed by treatment with 100 percent steam for 14 hours at 1290° F. and 0 p.s.i.g.

The cracking activity of the catalysts, prepared as described above, is a measure of their ability to catalyze the conversion of hydrocarbons. It is expressed herein as the percentage conversion of a Mid-Continent gas oil having a boiling range of 450 to 950° F. to gasoline having an end point of 410° F. by passing vapors of the said gas oil through the catalyst at 875° F., substantially atmospheric pressure, and a feed rate of 3.0 volumes of liquid oil per hour per volume of catalyst for ten minute runs between regenerations.

Table 1 below summarizes data obtained on catalysts consisting of 10 percent zeolite Y catalyst in a kaolin clay matrix:

TABLE 1

| Example | 1 | 2 | 3 | 4 | 5 |
|---|---|---|---|---|---|
| Zeolite: Type | ZnHY | ZnREHY | ZnREHY | ZnREHY | REH [1] |
| Exchange sequence | 3 x ZnNH$_4$ | RE/Zn/NH$_4$ | Zn/REHN$_4$/RENH$_4$ | Zn/NH$_4$/RE | Reference catalyst |
| Chem. anal., wt. percent: | | | | | |
| Na | 1.6 | 0.84 | 1.6 | 1.0 | 0.83 |
| Zn | 0.58 | 1.2 | 0.55 | 1.4 | --- |
| RE$_2$O$_3$ | --- | 3.16 | 10.1 | 14.5 | 20.3 |
| Fresh catalyst,[2] catalytic evaluation: | | | | | |
| Conversion, vol. percent | 69.0 | 71.1 | 72.2 | 73.1 | 75.6 |
| C$_4$-free gasoline, vol. percent | 59.0 | 61.2 | 63.1 | 63.0 | 63.1 |
| Total C$_4$'s, vol. percent | 14.6 | 13.5 | 13.6 | 13.8 | 16.2 |
| Dry gas, wt. percent | 4.9 | 5.2 | 5.1 | 5.3 | 5.9 |
| Coke, wt. percent | 2.4 | 2.4 | 3.0 | 2.9 | 3.4 |
| H$_2$, wt. percent | 0.08 | 0.08 | 0.07 | 0.07 | 0.07 |
| Steam stability,[3] catalytic evaluation: | | | | | |
| Conversion, vol. percent | 59.0 | 60.3 | 71.9 | 73.5 | 74.9 |
| C$_4$-free gasoline, vol. percent | 51.3 | 52.6 | 62.4 | 63.3 | 63.9 |
| Total C$_4$'s, vol. percent | 11.9 | 11.7 | 13.8 | 13.7 | 15.1 |
| Dry gas, wt. percent | 4.0 | 4.4 | 5.2 | 5.7 | 5.6 |
| Coke, wt. percent | 1.9 | 1.9 | 2.4 | 2.7 | 3.2 |
| H$_2$, wt. percent | 0.06 | 0.08 | 0.05 | 0.07 | 0.04 |
| Loss in activity, percent | 14 | 15 | 0 | 0 | 1 |
| Thermal stability,[4] catalytic evaluation: | | | | | |
| Conversion, vol. percent: | | | | | |
| Before test | 69.0 | 71.1 | 72.2 | 73.1 | 75.6 |
| After test | 55.9 | 56.0 | 63.6 | 37.1 | 48.4 |
| Loss in activity, percent | 19 | 21 | 12 | 49 | 36 |

[1] Shown for comparison.
[2] 10 hr./1,000° F./air/0 p.s.i.g., followed by 14 hr./1,290° F./100% steam/0 p.s.i.g.
[3] 5 hr./1,160° F./100% steam/100 p.s.i.g.
[4] 24 hr./1,550° F./5% steam/0 p.s.i.g., followed by 14 hr./1,290° F./100% steam/0 p.s.i.g.

The catalysts contained the amounts of zinc, rare earth and sodium reported in the table. Of particular interest is the catalyst containing between 6 and 13 percent rare earth oxide by weight and an amount of zinc less than 2.5 weight percent. Thus, attention is specifically directed to Example 3 wherein the rare earth oxide content is 10.1 percent and zinc was present in an amount of 0.55 weight percent. This catalyst lost no activity after the steam stability test and only 12% of its activity after the thermal stability test. On the other hand, the reference catalyst (Example 5), which contained much less sodium but no zinc, lost 36% of its activity after the thermal stability test. The effect of too low a rare earth oxide content is shown by Examples 1 and 2 where a 15% loss in activity was obtained after the steam stability test. The effect of too high a rare earth oxide content is shown by Example 4 where about half of its activity was lost after the thermal stability test.

Data obtained on other zeolite Y catalysts exchanged with zinc by various techniques are summarized in Tables 2 and 3 below:

TABLE 2

| Example | 6 | 7 | 8 | 9 | 10 | 11 | 4 | 12 | 2 | 13 | 14 |
|---|---|---|---|---|---|---|---|---|---|---|---|
| Zeolite: Type | ZnY | ZnHY | | ZnREY | | | | ZnREHY | | | |
| Exchange sequence | Zn | NH₄/Zn | Zn/NH₄ | RE/Zn | Zn/RE | Zn/RE/NH₄ | Zn/NH₄/RE | RE/NH₄/Zn | RE/Zn/NH₄ | NH₄/RE/Zn | NH₄/Zn/RE |
| Chem. anal., wt percent: | | | | | | | | | | | |
| na | 0.94 | 0.78 | 1.1 | 1.1 | 1.5 | 1.0 | 1.0 | 0.64 | 0.84 | 0.85 | 0.82 |
| Zn | 11.8 | 10.5 | 1.4 | 7.0 | 1.4 | 1.0 | 1.4 | 9.6 | 1.2 | 7.2 | 1.3 |
| RE₂O₃ | | | | 9.0 | 14.5 | 2.8 | 14.5 | 4.9 | 3.2 | 7.9 | 13.2 |
| Crystallinity, percent [1] | 75 | 75 | 115 | 105 | 100 | 105 | 90 | 70 | 105 | 70 | 60 |
| Fresh catalyst:[2] | | | | | | | | | | | |
| Physical properties: | | | | | | | | | | | |
| Appar. dens., g./cc | 0.75 | 0.76 | 0.76 | 0.77 | 0.77 | 0.73 | 0.75 | 0.78 | 0.75 | 0.75 | 0.76 |
| Surface area, m.²/g | 59 | 69 | 75 | 70 | 66 | 71 | 65 | 68 | 72 | 65 | 72 |
| CyC₆ ads, wt. percent | 1.7 | 1.7 | 2.0 | 1.8 | 1.9 | 1.7 | 1.6 | 1.8 | 1.8 | 1.8 | 1.9 |
| Catalytic evaluation: | | | | | | | | | | | |
| Conversion, vol. percent | 67.6 | 71.6 | 64.8 | 71.8 | 73.3 | 69.1 | 73.1 | 73.7 | 71.1 | 74.1 | 71.5 |
| C₄-free gaso, vol. percent | 56.3 | 59.8 | 56.0 | 59.8 | 62.1 | 59.7 | 63.0 | 60.5 | 61.2 | 62.5 | 60.6 |
| Total C₄'s, vol. percent | 12.8 | 14.2 | 13.8 | 15.0 | 14.7 | 13.8 | 13.8 | 15.3 | 13.5 | 15.3 | 15.0 |
| Dry gas, wt. percent | 5.3 | 5.4 | 4.4 | 5.7 | 5.7 | 5.0 | 5.3 | 6.1 | 5.2 | 5.4 | 5.2 |
| Coke, wt. percent | 3.3 | 3.7 | 2.1 | 3.4 | 2.9 | 2.2 | 2.9 | 3.7 | 2.4 | 3.5 | 3.1 |
| H₂, wt. percent | 0.19 | 0.21 | 0.07 | 0.12 | 0.08 | 0.07 | 0.07 | 0.20 | 0.08 | 0.12 | 0.08 |
| Steam stability [3] physical properties: | | | | | | | | | | | |
| Appar. dens., g./cc | 0.77 | | 0.79 | 0.80 | 0.79 | 0.78 | 0.79 | | 0.78 | | 0.78 |
| Surface area, m.²/g | 49 | | 60 | | 58 | 60 | 58 | | 65 | | 63 |
| CyC₆ ads, wt. percent | 1.5 | | 1.6 | | 1.7 | 1.4 | 1.6 | | 1.7 | | 1.3 |
| Catalytic evaluation: | | | | | | | | | | | |
| Conversion, vol. percent | 58.7 | | 54.8 | 68.1 | 72.3 | 61.8 | 73.5 | | 60.3 | | 71.8 |
| C₄-free gaso, vol. percent | 51.9 | | 48.2 | 59.1 | 62.2 | 54.9 | 63.3 | | 52.6 | | 62.0 |
| Total C₄'s, vol. percent | 9.9 | | 10.5 | 13.6 | 14.0 | 11.9 | 13.7 | | 11.7 | | 14.3 |
| Dry gas, wt. percent | 4.0 | | 3.8 | 4.7 | 5.1 | 4.2 | 5.7 | | 4.4 | | 4.9 |
| Coke, wt. percent | 2.0 | | 1.8 | 2.4 | 2.8 | 1.6 | 2.7 | | 1.9 | | 2.6 |
| H₂, wt. percent | 0.18 | | 0.07 | 0.09 | 0.06 | 0.06 | 0.03 | | 0.08 | | 0.08 |
| Loss in activity, percent | 13 | | 15 | 5 | 1 | 11 | 0 | | 15 | | 0 |
| Thermal stability [4] catalytic evaluation: | | | | | | | | | | | |
| Conversion, vol. percent: | | | | | | | | | | | |
| Before test | | | 64.8 | | 73.3 | 69.1 | 73.1 | | 71.1 | | 71.5 |
| After test | | | 30.9 | | 31.0 | 51.1 | 37.1 | | 56.0 | | 41.4 |
| Loss in activity, percent | | | 52 | | 58 | 26 | 49 | | 21 | | 42 |

[1] Zeolites containing RE based on REY std.; all others based on original NaY.
[2] 10 hr./1,000° F./air/0 p.s.i.g.; followed by 14 hr./1,290° F./100% st./0 p.s.i.g.
[3] 5 hr./1,160° F./100% st./100 p.s.i.g.
[4] 24 hr./1,550° F./5% st./0 p.s.i.g., followed by 14 hr./1,290° F./100% st./0 p.s.i.g.

TABLE 3

| Example | 15 | 16 | 17 | 18 | 3 | 19 | 1 | 20 |
|---|---|---|---|---|---|---|---|---|
| Zeolite: Type | ZnREHY | | | | | | | |
| Competitive exchange sequence | 3 X ZnRENH$_4^1$ | ZnRENH$_4$/Cal./ZnRENH$_4^1$ | 3 X ZnRENH$_4^2$ | ZnRENH$_4$/Cal./ZnRENH$_4^2$ | Zn/RENH$_4$/RENH$_4$ | Zn/Cal./RENH$_4$ | 3 X ZnNH$_4$ | ZnNH$_4$/Cal./ZnNH$_4$ |
| Chem. anal., wt percent: | | | | | | | | |
| Na | 1.5 | 0.32 | 1.5 | 0.44 | 1.6 | 1.7 | 1.6 | 0.34 |
| Zn | 0.75 | 0.13 | 0.63 | 0.18 | 0.55 | 1.8 | 0.58 | 0.15 |
| RE$_2$O$_3$ | 9.8 | 10.7 | 7.1 | 7.7 | 10.1 | 11.3 | | |
| Crystallinity, percent | 60 | 105 | 140 | 110 | 65 | 60 | 120 | 160 |
| Fresh catalyst: | | | | | | | | |
| Physical properties: | | | | | | | | |
| Appar. dens., g./cc | 0.78 | 0.79 | 0.79 | 0.79 | 0.78 | 0.78 | 0.77 | 0.76 |
| Surface area, m.$^2$/g | 64 | 71 | 65 | 68 | 79 | 70 | 66 | 86 |
| CyC$_6$ ads., wt. percent | 1.6 | 1.9 | 2.0 | 2.0 | 1.6 | 1.5 | 1.7 | 1.7 |
| Catalytic evaluation: | | | | | | | | |
| Conversion, vol. percent | 75.0 | 73.9 | 73.5 | 72.9 | 72.2 | 75.2 | 69.0 | 61.3 |
| C$_4$-free gaso., vol. percent | 63.6 | 63.1 | 62.5 | 62.8 | 63.1 | 63.2 | 59.0 | 53.4 |
| Total C$_4$'s, vol. percent | 14.8 | 14.3 | 14.4 | 14.0 | 13.6 | 15.6 | 14.6 | 12.1 |
| Dry gas, wt. percent | 5.7 | 5.5 | 5.7 | 5.4 | 5.1 | 6.2 | 4.9 | 4.1 |
| Coke, wt. percent | 3.0 | 2.9 | 2.6 | 2.5 | 3.0 | 3.1 | 2.4 | 2.1 |
| H$_2$, wt. percent | 0.08 | 0.06 | 0.08 | 0.07 | 0.07 | 0.09 | 0.08 | 0.07 |
| Steam stability: | | | | | | | | |
| Physical properties: | | | | | | | | |
| Appar. dens., g./cc | 0.80 | 0.79 | 0.78 | 0.77 | 0.76 | 0.79 | 0.79 | 0.77 |
| Surface area, m.$^2$/g | 69 | 60 | 67 | 65 | 54 | 70 | 71 | 62 |
| CyC$_6$ ads., wt. percent | 1.3 | 1.5 | 1.6 | 1.7 | 1.6 | 1.8 | 1.3 | 1.8 |
| Catalytic evaluation: | | | | | | | | |
| Conversion, vol. percent | 72.8 | 71.8 | 69.9 | 70.0 | 71.9 | 73.0 | 59.0 | 51.1 |
| C$_4$-free gaso., vol. percent | 63.0 | 62.1 | 61.1 | 61.3 | 62.4 | 63.4 | 51.3 | 44.9 |
| Total C$_4$'s, vol. percent | 14.2 | 13.5 | 12.4 | 13.6 | 13.8 | 14.0 | 11.9 | 9.9 |
| Dry gas, wt. percent | 5.4 | 5.2 | 5.2 | 4.9 | 5.2 | 5.2 | 4.0 | 3.5 |
| Coke, wt. percent | 2.5 | 2.5 | 2.4 | 2.2 | 2.4 | 2.5 | 1.9 | 1.7 |
| H$_2$, wt. percent | 0.06 | 0.05 | 0.07 | 0.05 | 0.05 | 0.06 | 0.06 | 0.06 |
| Loss in activity, percent | 3 | 3 | 5 | 4 | 0 | 3 | 14 | 17 |
| Thermal stability, catalytic evaluation: | | | | | | | | |
| Conversion, vol. percent: | | | | | | | | |
| Before test | 75.0 | | 73.5 | 72.9 | 75.2 | 75.2 | 69.0 | |
| After test | 59.9 | | 60.1 | 64.3 | 63.6 | 62.9 | 55.9 | |
| Loss in activity, percent | 20 | | 18 | 12 | 12 | 16 | 19 | |

¹ 10/45/45 wt. ratio of 10 wt. percent Zn(NO$_3$)$_2$/RECl$_3$/NH$_4$Cl solutions.
² 25/25/50 wt. ratio of 10 wt. percent Zn(NO$_3$)$_2$/RECl$_3$/NH$_4$Cl solutions.

In addition to Example 3 in Table 1, catalysts which contain desirable amounts of zinc and rare earth are those of Examples 15, 16, 17, 18 and 19. The harmful effect of too high a zinc content on selectivity during the cracking operation is demonstrated by Examples 6, 7, 9, 12 and 13. The adverse effect on steam stability caused by insufficient rare earth is shown by Examples 1, 2, 8, 11 and 20. Examples 4, 10 and 14 illustrate the poorer thermal stability resulting from too high a rare earth content.

It is to be understood that the foregoing description is merely illustrative of preferred embodiments of the invention of which many variations may be made by those skilled in the art within the scope of the following claims without departing from the spirit thereof.

I claim:
1. A crystalline aluminosilicate Y-type zeolite, containing exchanged rare earth cations in an amount corresponding to between 6 and 13 weight percent calculated as rare earth oxide and exchanged zinc in an amount between 0.05 and 2.5 weight percent, and a hydrogen precursor or hydrogen.

2. A crystalline aluminosilicate zeolite according to claim 1 wherein zinc is present in an amount between 0.1 and 2 weight percent.

3. A crystalline aluminosilicate zeolite according to claim 1 composited with a porous inorganic oxide matrix material.

4. A crystalline aluminosilicate zeolite according to claim 1 wherein said zeolite is composited with clay, the zeolite component of the composition being between 1 and 90 percent by weight, based on the weight of the composition.

References Cited
UNITED STATES PATENTS

| 3,669,903 | 6/1972 | Bourquet et al. | 252—455 Z |
| 3,558,476 | 1/1971 | Robbins, Jr., et al. | 252—455 Z |
| 3,395,096 | 7/1968 | Gladrow et al. | 252—455 Z |
| 3,578,723 | 5/1971 | Bowes et al. | 252—455 Z |

CARL F. DEES, Primary Examiner

UNITED STATES PATENT OFFICE
CERTIFICATE OF CORRECTION

Patent No. 3,804,780     Dated April 16, 1974

Inventor(s) ROBERT C. WILSON, JR.

It is certified that error appears in the above-identified patent and that said Letters Patent are hereby corrected as shown below:

Column 5, line 5, "composition" should read --compositing--.

Table 1, Column 5, heading should read --REY--, not "REH"

Table 1, Column 3, Exchange sequence heading should read --Zn/RENH$_4$/RENH$_4$--, not "Zn/REHN$_4$/RENH$_4$".

Table 2, Column 8, line 29, should read --10.5--, not "50.5"

Signed and sealed this 29th day of October 1974.

(SEAL)
Attest:

McCOY M. GIBSON JR.
Attesting Officer

C. MARSHALL DANN
Commissioner of Patents